US007958368B2

(12) United States Patent
Dewey et al.

(10) Patent No.: US 7,958,368 B2
(45) Date of Patent: Jun. 7, 2011

(54) PASSWORD-AUTHENTICATED GROUPS

(75) Inventors: Jeremy L. Dewey, Redmond, WA (US); Noah Horton, Redmond, WA (US); Rohit Gupta, Redmond, WA (US); Todd R. Manion, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1136 days.

(21) Appl. No.: 11/486,544

(22) Filed: Jul. 14, 2006

(65) Prior Publication Data

US 2008/0013537 A1    Jan. 17, 2008

(51) Int. Cl.
 G06F 21/00 (2006.01)
(52) U.S. Cl. ............................. 713/183; 726/2
(58) Field of Classification Search .................. 713/183; 726/2
 See application file for complete search history.

(56) References Cited

U.S. PATENT DOCUMENTS

| 5,345,594 | A | 9/1994 | Tsuda |
| 5,748,736 | A | 5/1998 | Mittra |
| 6,161,139 | A | 12/2000 | Win et al. |
| 6,182,142 | B1 | 1/2001 | Win et al. |
| 6,223,177 | B1 * | 4/2001 | Tatham et al. ................ 707/9 |
| 6,230,269 | B1 * | 5/2001 | Spies et al. ................ 713/182 |
| 6,256,663 | B1 * | 7/2001 | Davis ........................ 709/204 |
| 6,636,966 | B1 | 10/2003 | Lee et al. |
| 6,668,322 | B1 | 12/2003 | Wood et al. |
| 6,807,569 | B1 | 10/2004 | Bhimani et al. |
| 6,845,395 | B1 | 1/2005 | Blumenau et al. |
| 6,862,699 | B2 | 3/2005 | Nakashima et al. |
| 6,883,100 | B1 | 4/2005 | Elley et al. |
| 6,892,307 | B1 | 5/2005 | Wood et al. |
| 6,907,546 | B1 | 6/2005 | Haswell et al. |
| 6,912,522 | B2 | 6/2005 | Edgar |
| 6,944,761 | B2 | 9/2005 | Wood et al. |
| 6,983,381 | B2 | 1/2006 | Jerdonek |
| 6,996,714 | B1 | 2/2006 | Halasz et al. |
| 7,035,442 | B2 | 4/2006 | Ha et al. |
| 7,058,696 | B1 | 6/2006 | Phillips et al. |

(Continued)

FOREIGN PATENT DOCUMENTS

WO    WO 01/82037    2/2001

(Continued)

OTHER PUBLICATIONS

Stein (Lincoln D. Stein, "Web Sercurity, a step-by -step reference guide", 1998, ISBN: 0201634899), p. 38-42.*

(Continued)

*Primary Examiner* — Peter Poltorak
(74) *Attorney, Agent, or Firm* — Hope Baldauff Hartman, LLC

(57) ABSTRACT

A system, apparatus, method, and computer-readable medium are provided for authorizing a computing node to participate in a group of computing nodes utilizing a shared group password. According to one method described herein, an invitation to join a group is transmitted to a tentative group member node. The invitation is used to establish a connection with a group member node of the group. The tentative group member node generates a hash of a group password and transmits the hash to the group member node. When the group member node receives the hash, the group member node compares the received value to a previously stored hash of the group password. If the previously stored value is identical to the value received from the tentative group member node, then the tentative group member node is authorized as a new member of the group. Otherwise the tentative group member node is not permitted to become a member of the group.

9 Claims, 5 Drawing Sheets

U.S. PATENT DOCUMENTS

| | | | |
|---|---|---|---|
| 7,069,437 B2 | 6/2006 | Williams | |
| 7,085,840 B2 | 8/2006 | de Jong et al. | |
| 7,085,931 B1 | 8/2006 | Smith et al. | |
| 7,103,772 B2 | 9/2006 | Jorgensen et al. | |
| 7,114,080 B2 | 9/2006 | Rahman et al. | |
| 7,158,777 B2 | 1/2007 | Lee et al. | |
| 7,181,762 B2 | 2/2007 | Jerdonek | |
| 7,275,156 B2 | 9/2007 | Balfanz et al. | |
| 7,275,157 B2 | 9/2007 | Cam Winget | |
| 7,318,155 B2* | 1/2008 | Yellepeddy | 713/158 |
| 7,458,095 B2 | 11/2008 | Forsberg | |
| 7,549,048 B2 | 6/2009 | Freeman et al. | |
| 2001/0022780 A1 | 9/2001 | Mizutani et al. | |
| 2001/0049787 A1* | 12/2001 | Morikawa et al. | 713/156 |
| 2002/0023132 A1* | 2/2002 | Tornabene et al. | 709/205 |
| 2002/0059545 A1 | 5/2002 | Nakashima et al. | |
| 2002/0087857 A1 | 7/2002 | Tsao et al. | |
| 2002/0087887 A1* | 7/2002 | Busam et al. | 713/201 |
| 2002/0095569 A1 | 7/2002 | Jerdonek | |
| 2002/0116611 A1 | 8/2002 | Zhou et al. | |
| 2002/0141560 A1* | 10/2002 | Khayatan et al. | 379/219 |
| 2002/0147810 A1* | 10/2002 | Traversat et al. | 709/224 |
| 2002/0156787 A1* | 10/2002 | Jameson et al. | 707/10 |
| 2002/0161826 A1 | 10/2002 | Arteaga et al. | |
| 2003/0005117 A1 | 1/2003 | Kang et al. | |
| 2003/0041244 A1 | 2/2003 | Buttyan et al. | |
| 2003/0055962 A1 | 3/2003 | Freund et al. | |
| 2003/0055974 A1 | 3/2003 | Brophy et al. | |
| 2003/0056093 A1 | 3/2003 | Huitema et al. | |
| 2003/0084293 A1 | 5/2003 | Arkko et al. | |
| 2003/0090998 A1 | 5/2003 | Lee et al. | |
| 2003/0093676 A1 | 5/2003 | Kawamura et al. | |
| 2003/0115324 A1 | 6/2003 | Blumenau et al. | |
| 2003/0169883 A1 | 9/2003 | Leroux et al. | |
| 2003/0172090 A1 | 9/2003 | Asunmaa et al. | |
| 2003/0177390 A1 | 9/2003 | Radhakrishnan | |
| 2003/0204734 A1* | 10/2003 | Wheeler | 713/184 |
| 2003/0226017 A1 | 12/2003 | Palekar et al. | |
| 2003/0236820 A1 | 12/2003 | Tierney et al. | |
| 2004/0054891 A1* | 3/2004 | Hengeveld et al. | 713/163 |
| 2004/0088409 A1 | 5/2004 | Braemer et al. | |
| 2004/0088582 A1 | 5/2004 | Hovmark et al. | |
| 2004/0098588 A1 | 5/2004 | Ohba et al. | |
| 2004/0107360 A1 | 6/2004 | Herrmann et al. | |
| 2004/0117818 A1 | 6/2004 | Karaoguz et al. | |
| 2004/0122956 A1 | 6/2004 | Myers et al. | |
| 2004/0128183 A1* | 7/2004 | Challey et al. | 705/10 |
| 2004/0148333 A1 | 7/2004 | Manion et al. | |
| 2004/0148504 A1 | 7/2004 | Forsberg | |
| 2004/0148611 A1* | 7/2004 | Manion et al. | 719/328 |
| 2004/0189713 A1* | 9/2004 | Thames et al. | 345/810 |
| 2005/0015588 A1 | 1/2005 | Lin et al. | |
| 2005/0088999 A1 | 4/2005 | Waylett et al. | |
| 2005/0114713 A1 | 5/2005 | Beckman et al. | |
| 2005/0120213 A1 | 6/2005 | Winget et al. | |
| 2005/0160367 A1* | 7/2005 | Sirota et al. | 715/753 |
| 2005/0165953 A1 | 7/2005 | Oba et al. | |
| 2005/0172175 A1 | 8/2005 | Bhat et al. | |
| 2005/0177715 A1 | 8/2005 | Somin et al. | |
| 2005/0188211 A1 | 8/2005 | Scott et al. | |
| 2005/0216555 A1 | 9/2005 | English et al. | |
| 2005/0220304 A1* | 10/2005 | Lenoir et al. | 380/255 |
| 2006/0067272 A1 | 3/2006 | Wang et al. | |
| 2006/0200681 A1 | 9/2006 | Kato et al. | |

FOREIGN PATENT DOCUMENTS

| | | |
|---|---|---|
| WO | WO 03/038578 | 10/2002 |

OTHER PUBLICATIONS

Cox (Philip C. Cox and Paul B. Hill, "More Than You Ever Wanted to Know about NT Login Authentication", SystemExperts Corporation, 2001, http://www.systemexperts.com/tutors/NT_Login_3.0.pdf), p. 1-5 plust date sheet.*

Microsoft Dictionary (Microsoft Press, "Computer Dictionary", 5th edition, Microsoft Press, ISBN 9780735614956, May '02).*

Amir et al, "Scaling Secure Group Communication Systems: Beyond Peer-to-Peer", http://www.cnds.jhu.edu/pub/papers/discex3_scalable.pdf.

Fekete et al, "Specifying and Using a Partitionable Group Communication Service", Jun. 20, 1999, http://citeseer.ist.psu.edu/cache/papers/cs/26084/http:zSzzSzwww.lcs.mit.eduzSzpublicationszSzpubszSzpdfzSzMIT-LCS-TM-570b.pdf/fekete99specifying.pdf.

Kim Yongdae, "Secure Admission Control in Peer Groups on the Internet", http://www.grad.umn.edu/faculty-staff/funding/dean/gia/examples/documents/S03Kim.pdf.

Li et al, "A Framework for Role-Based Access Control in Group Communication Systems", https://www.cerias.purdue.edu/tools_and_resources/bibtex_archive/archive/2003-31.pdf.

Aboba et al., "PPP EAP TLS Authentication Protocol", RFC 2716, 1999, p. 1-24.

Anderson et al., "Protected Eap Protocol (PEAP)", PPPEXT Working Group, 2002, p. 1-42.

Blunk et al., "PPP Extensible Authentication Protocol (EAP)", RFC 2284, 1998, p. 1-15.

Dierks et al., "The TLS Protocol Version 1.0", RFC 2246, 1999, p. 1-80.

Haller et al. "One-Time Password System", Feb. 1998, RFC Working Group, p. 1-24.

Hess et al., "Advanced Client/Server Authentication in TLS", Network and Distributed System Security Symposium, San Diego, CA, Feb. 2002. http://citeseer.ist.psu.edu/hess02advanced.html.

Powell, M., "Ws-Security Authentication and Digital Signatures with Web Services Enhancements", Dec. 2002, Microsoft Corporation, p. 1-26.

Salgarelli et al., "Eap-Shared Key Exchange (EAP-SKE): A Scheme for Authentication and Dynamic Key Exchange in 802.1x Networks", Apr. 30, 2002, p. 2-3, 8-10 and 17-18.

Simpson, W., "PPP Challenge Handshake Authentication Protocol (CHAP)", Aug. 1996, RFC Working Group, p. 1-13.

U.S. Official Action dated May 7, 2007 in U.S. Appl. No. 10/804,591.

U.S. Official Action dated Mar. 14, 2008 in U.S. Appl. No. 10/804,591.

U.S. Official Action dated Sep. 2, 2008 in U.S. Appl. No. 10/804,591.

U.S. Notice of Allowance/Allowability dated Mar. 17, 2009 in U.S. Appl. No. 10/804,591.

* cited by examiner

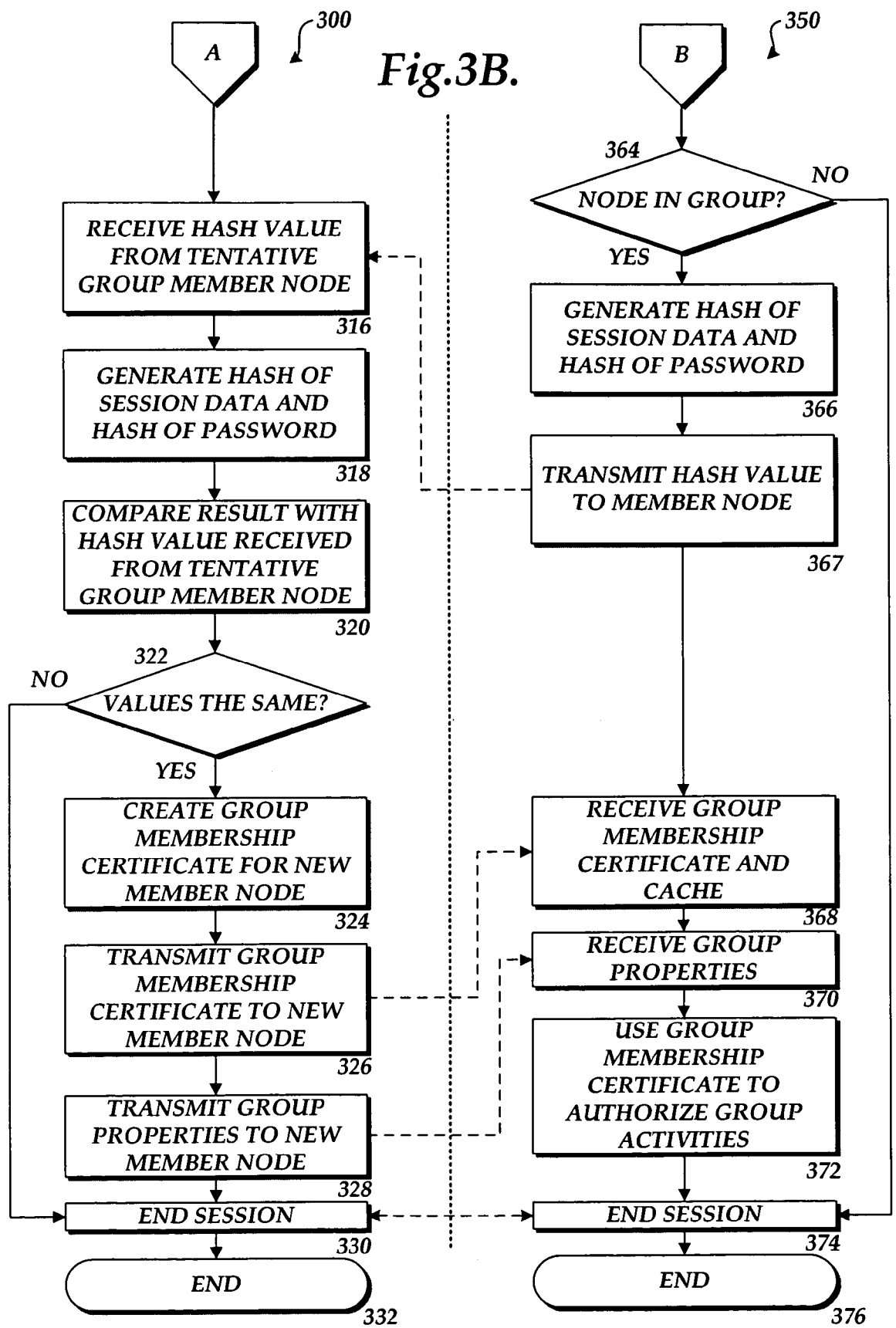

PASSWORD-AUTHENTICATED GROUPS

BACKGROUND

A peer-to-peer ("P2P") system is a network that relies primarily on the computing power and bandwidth of participants in the network rather than concentrating it in a relatively low number of servers. P2P systems are commonly used to connect computing nodes via ad-hoc networks. P2P systems are useful for many purposes, including real-time communications ("RTC"), collaboration, content distribution, distributed processing, file sharing, and others.

In P2P systems, it is often necessary to create secure groups of computing nodes. For instance, it may be desirable for a group of computing nodes to create a secure group for the purposes of enabling collaboration on a project or secure instant messaging among group members. It is, therefore, desirable to restrict the participation in a peer group to a set of nodes known as group members. Other computing nodes that are not authorized as members of the group should not be permitted to connect to the group or participate in group activities.

In standard client-server systems, servers typically provide authentication and authorization services. In a P2P system, however, there are no centralized servers with security databases that can provide these security services. In a serverless peer environment, the peer computing nodes must provide their own authentication. In many cases, authentication is performed in P2P systems utilizing identity certificates. These identity certificates may be issued and signed by a central authority, or they may be self-signed certificates that are signed by their creators.

Previous P2P authorization solutions require significant out-of-band communication between an administrator node and the tentative group member in order for the tentative group member to become a member of a group. In particular, in previous solutions, several rounds of out-of-band communication, including the insecure transmission of self-signed certificates must take place in order to add a new member to a group. Previous solutions, therefore, are unnecessarily complicated, require excessive user intervention and require the unnecessary utilization of computing resources in order to add a new member to a group of computing nodes. The only alternative to simplify authorization in current solutions is to do away with specific node authentication, and simply assume that any anonymous node that presents a shared secret has the same permissions to the group. This alternative lacks the ability to differentiate permission levels, and prevents the association of actions and data in the group with the node responsible for that action or data.

It is with respect to these considerations and others that aspects of a computing system for authorizing the granting of authority to a computing node to participate in a group of computing nodes utilizing a shared group password is described below.

SUMMARY

A system, apparatus, method, and computer-readable medium are provided for authorizing the granting of authority to a computing node to participate in a group of computing nodes utilizing a shared group password. According to one aspect of the disclosure provided herein, a shared password is utilized to authorize a tentative group member node for group membership. Use of the shared password allows the process of authorizing group membership for a tentative group member to be simplified.

According to one method described herein, a computing node is granted authority to participate in a group of computing nodes as a member using a shared group password. In order to grant authority to the computing node, an invitation to join the group is transmitted to a tentative group member node. The invitation contains data that can be utilized by the tentative group member node to locate and establish a connection to a group member node that is authorized to grant group membership authority. The invitation may be transmitted to the tentative group member node using an out-of-band communications medium, such as e-mail. A group password is also transmitted to the tentative group member node, or a user of the node, out-of-band.

In response to receiving the invitation, the tentative group member node utilizes the data contained in the invitation to establish a connection with a group member node authorized to grant group membership authority. The connection may comprise a secure encrypted communications channel. The tentative member node also transmits its identity certificate to the group member node during the establishment of the communications channel. The group member node transmits its group membership certificate ("GMC") to the tentative member node. The group membership credential is a certificate that chains back to a certificate called the group root certificate. The GMC is utilized by the tentative group member node to determine whether the group member node is actually a member of the group capable of granting group membership authority, or if the node is an imposter.

If the tentative group member node determines from the GMC that the group member node is actually a group member who can grant group membership authority, the tentative group member node generates a hash of the password and transmits the hash to the group member node. In embodiments, a hash of a hash of the password and session data unique to the connection with the group member node may be transmitted for increased security. When the group member node receives the hash, the group member node compares the received value to a previously stored hash of the group password. If the previously stored value matches the value received from the tentative group member node, then the tentative group member node is granted authority to be a member of the group. Otherwise the tentative group member node is not permitted to become a member of the group.

In order to grant authority to the tentative group member node to be a group member, the group member node utilizes the identity certificate received from the tentative group member node to generate a GMC for the new member. The GMC is transmitted to the tentative member node and is thereafter utilized by the new member node to confirm that the node is a member of the group. The GMC may be encrypted using a key derived from the password prior to sending to the tentative group member node. Group properties, possibly including the stored hash of the group password, are also propagated to the new group member node.

According to other aspects provided herein, a create group invitation application programming interface ("API") is provided. The create group invitation API is operative to receive one or more group properties and to create an invitation using the properties for transmission to a tentative group member node. The invitation contains data for establishing a connection to a member node of the group authorized to grant group membership authority. A password group join API is also provided that is operative to receive the invitation and a group password, to establish a connection to the member node using the data contained in the invitation, to generate a hash of the group password, and to transmit the hash to the group member node.

The above-described subject matter may also be implemented as a computer-controlled apparatus, a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 3A-3B are flow diagrams illustrating aspects of illustrative processes for authorizing a computing node to participate in a group of computing nodes utilizing a shared group password as provided herein.

DETAILED DESCRIPTION

Figure 1:
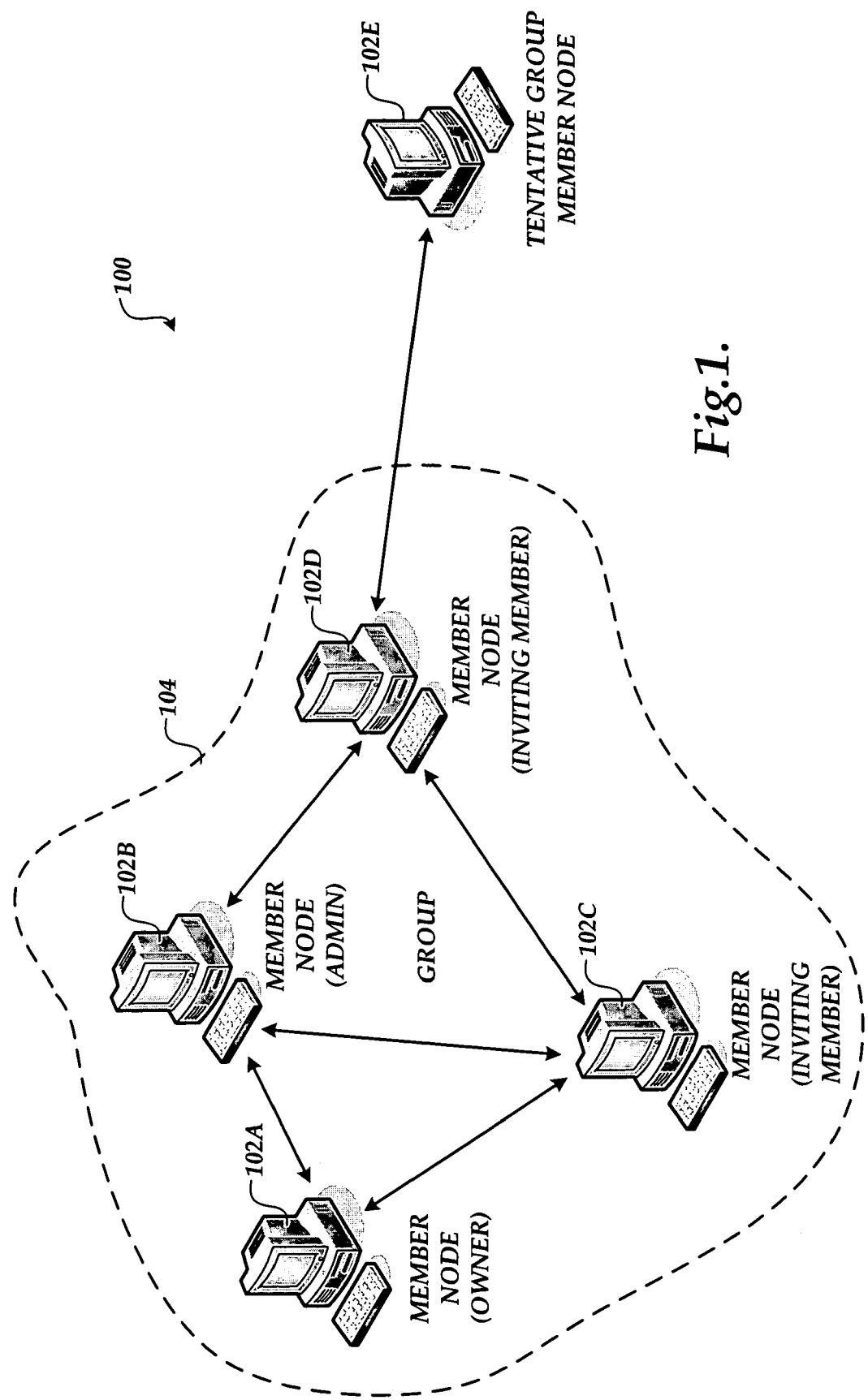
FIG. 1 is a network diagram showing an illustrative operating environment for the processes and computer systems described herein.

The following detailed description is directed to systems, methods, and computer-readable media for authorizing a computing node to join a group of computing nodes through the use of a shared password. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like. The subject matter described herein is also described as being practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for authorizing a computing node as a group member using a password will be described.

FIG. 1 shows aspects of an illustrative operative environment for the subject matter described herein. In particular, FIG. 1 is a network diagram illustrating aspects of a computing system 100 for authenticating a computing node as a member of a group utilizing a password. As shown in FIG. 1, the system 100 includes two or more computer systems 102A-102E, referred to herein as "nodes" or "computing nodes", connected to one another via a suitable computing network. It should be appreciated that although a communications network is not explicitly shown in FIG. 1, or the other figures, the computer systems shown in the figures and described herein are connected by way of a suitable local area network ("LAN") or wide area network ("WAN"), such as the Internet.

As illustrated in FIG. 1, the nodes 102A-102D are members of a group 104. The nodes that are members of a group are referred to herein as group member nodes, or more simply member nodes. Being a member of the group 104 means that each of the nodes 102A-102D can authenticate that other nodes are members of the group 104. Being a member of the group 104 also means that secure communications can be made between only members of the group 104. This is useful, for instance, in connection with RTC, collaboration, content distribution, file sharing, and other processes that utilize a group of distributed, secure communicating nodes. As will be described in detail below, methods, systems, apparatus, and computer-readable media are provided herein for securely adding a new node to the group 104 utilizing a shared password.

As also shown in FIG. 1, the computing node 102E is not a member of the group 104. A computing node 102E that is not a member of a group, but that desires to become a member of a group, is referred to herein as a tentative group member node. The computing node 102E is a tentative group member node. A process for securely adding the tentative group member node 102E to the group 104 is described below with reference to FIGS. 2-3B.

As also shown in FIG. 1, the nodes 102A-102D of the group 104 may be assigned different roles. The role of a node defines the functions that the node is authorized to perform. In the example group 104 shown in FIG. 1, each of the nodes 102A-102D are inviting members of the group 104. An inviting member is a node that can add, update, and delete its own records, and also add new nodes to the group 104. The node 102A is also an owner of the group, and the node 102B is an administrator. An administrator is a node that can add, update, and delete its own records or the records of other nodes, and also add new nodes to the group 104. An administrator can also create new groups. An administrator that creates a new group is considered the owner of the group.

As will be described in greater detail below, an invitation is transmitted to a tentative group member node 102E by a member of the group, such as the member node 102D. A group password that is utilized by the tentative group member node 102E to join the group is also transmitted to the node 102E, or a user of the node 102E, out-of-band of the invitation. In order to join the group 104, the tentative group member node 102E utilizes the invitation to connect to a member of the group, such as the member node 102D. An exchange then occurs between the tentative group member node 102E and the member node 102D, whereby the tentative group member node 102E may or may not be authorized as a new member of the group 104. Details regarding this process are provided below with respect to FIGS. 2-3B.

Figure 2:
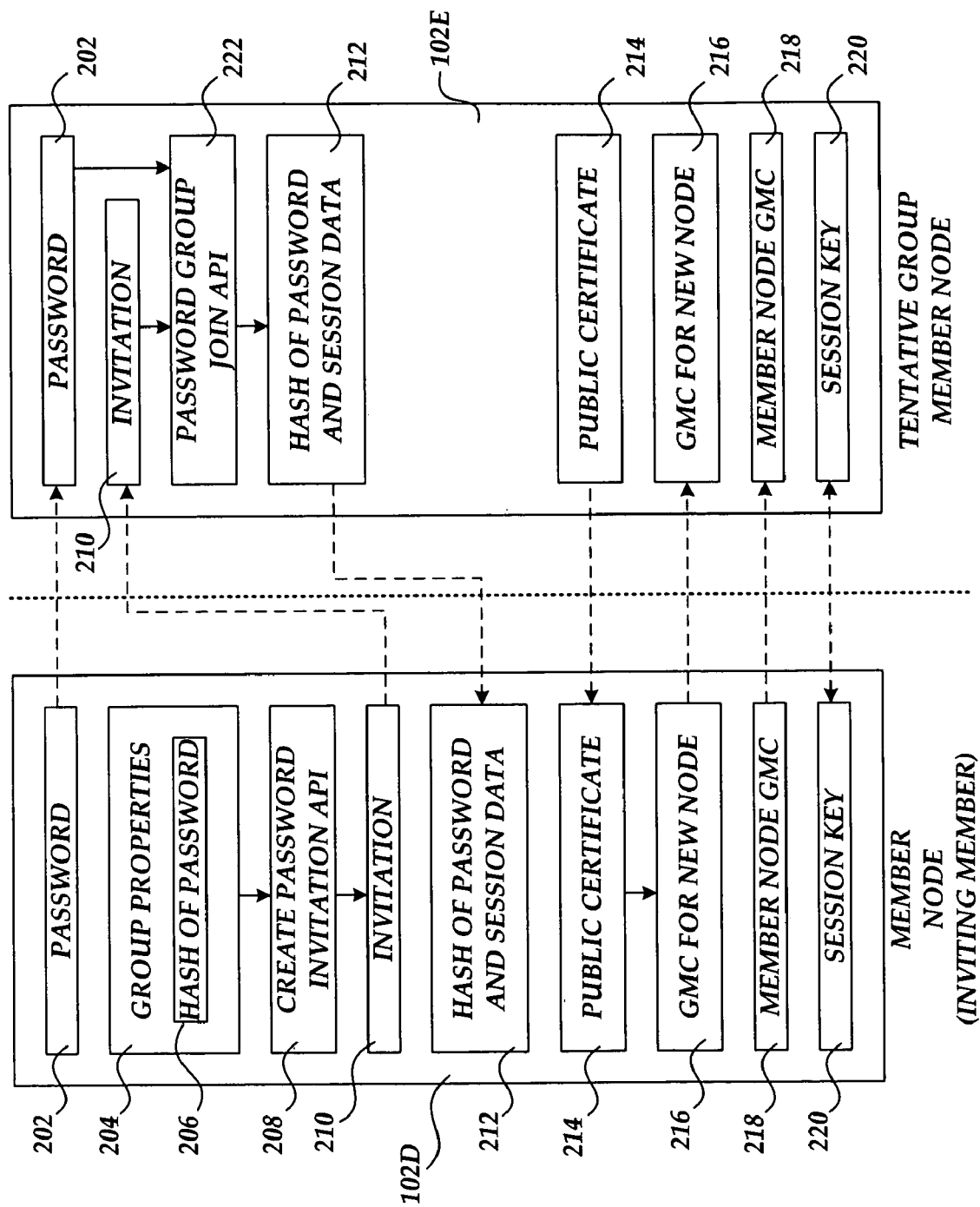
FIG. 2 is a software architecture diagram illustrating aspects of the operation of a group member node and a tentative group member node provided herein.
Figure 3A:
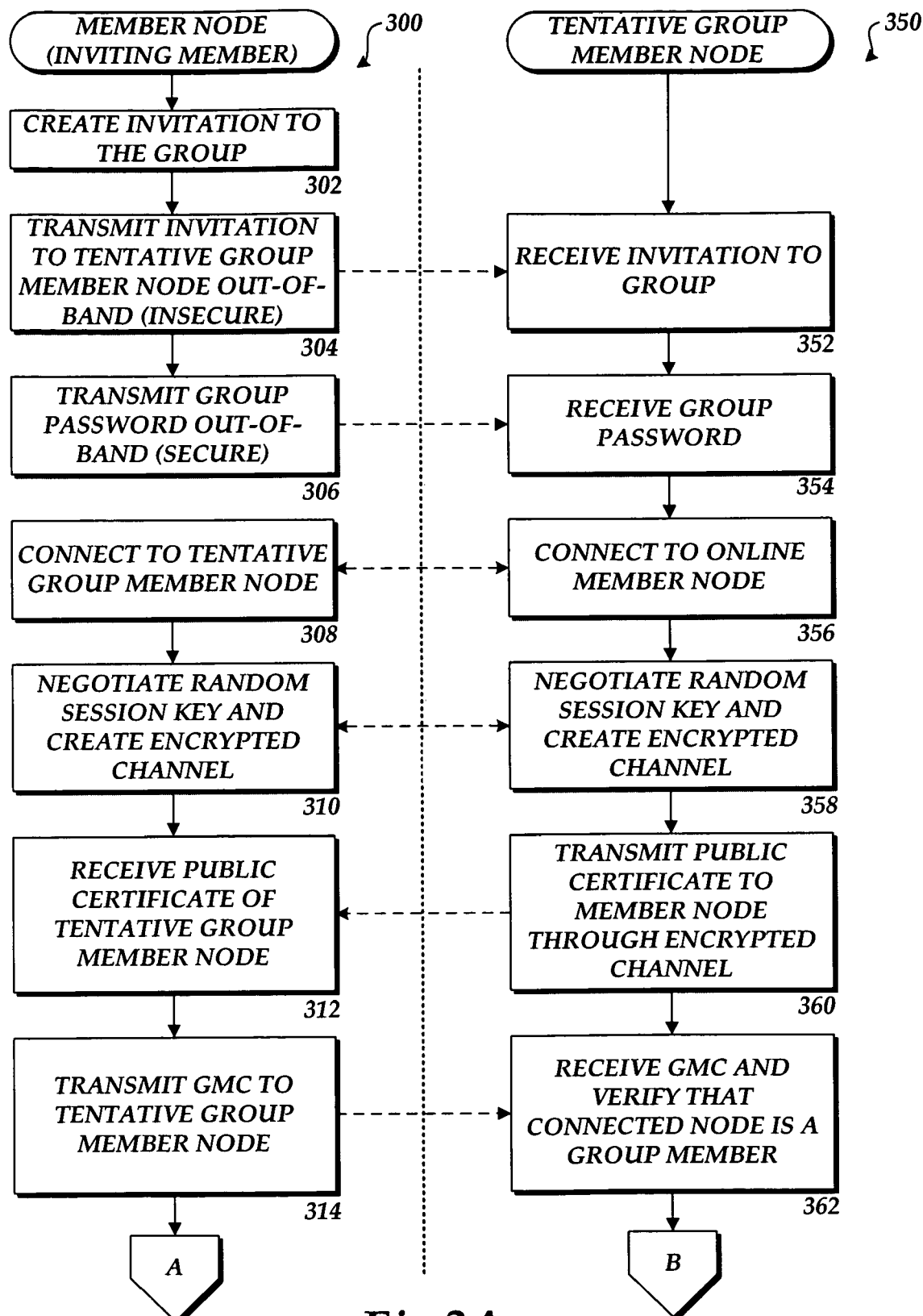

Referring now to FIGS. 2 and 3A-3B, additional details will be provided regarding the embodiments presented herein for authorizing a computing node as a group member utilizing a password. In particular, FIG. 2 is a software architecture diagram illustrating several software components utilized by a member node 102D and a tentative group member node 102E. FIGS. 3A-3B are flow diagrams illustrating a routine 300 and a routine 350 performed by a member node 102D and a tentative group member node 102E, respectively, in order to authorize the tentative group member node 102E as a group member using a password.

It should be appreciated that the logical operations described with reference to FIGS. 2 and 3A-3B are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

As discussed briefly above, the routine 300 illustrates the processing operations performed by a member node 102D in order to assist with the addition of a tentative group member node 102E to a group. It should be appreciated that any member node of a group may perform the processing illustrated in the routine 300. The routine 350 illustrates the processing performed by the tentative group member node 102E. The routines 300 and 350 will be described with reference to the various software components illustrated in FIG. 2. The routine 300 begin at processing operation 302, where the group member node 102D creates an invitation 210 to join the group. The invitation 210 contains data that can be utilized by the tentative group member node to locate and establish a connection to a member node of the group 104.

According to one implementation, a create group password invitation API 208 is utilized by the member node 102D to create the invitation 210. The create group password invitation API 208 takes as input one or more group properties 204 and utilizes the group properties 204 to create the invitation. The group properties 204 may contain, for instance, the name of the group, the name of the creator of the group, a friendly name for the group, data indicating a lifetime for the group, the available authorization schemes for authorizing new members in the group, a group password, and other information. As will be described in greater detail below, the group password may be stored as a hash of the group password 206. Storing the group password as a hash is slightly more secure than storing the group password itself, and allows the creator to change the password at a later time to effectively stop password-based invitations from being used. As will also be described in greater detail below, the group properties 204 are propagated to each member of the group 104.

From operation 302, the routine 300 continues to operation 304, where the invitation 210 is transmitted from the member node 102D to the tentative group member node 102E. According to one implementation, the invitation 210 is transmitted to the tentative group member node 102E using an out-of-band communications method, such as e-mail. The method utilized for communicating the invitation 210 need not be secure. The routine 350 begins at operation 352, where the tentative group member node 102E receives the invitation 210.

From operation 304, the routine 300 continues to operation 306, where the group password 202 is transmitted to the tentative group member node 102E. Like the invitation 210, the group password 202 is transmitted to the tentative group member node 102E, or an operator of the node, out-of-band. The tentative group member node 102E receives the password 202 at operation 354 of the routine 350. The group password 202 may comprise any type of password that may be provided by the tentative group member node 102E to prove that it is authorized to join the group 104.

From operation 354, the routine 350 continues to operation 356, where the tentative group member node 102 utilizes the data contained in the invitation 210 to establish a connection to a member of the group 104. In the example described herein and illustrated in FIG. 1, the tentative group member node 102 utilizes the data contained in the invitation 210 to connect to the group member node 102D. The group member node 102D connects with the tentative group member node 102E at operation 308 of the routine 300.

From operation 308, the routine 300 continues to operation 310, where the member node 102D and the tentative group member node 102E establish a secure, encrypted communications channel. As a part of the establishment of the communications channel, a random session key 220 is also created and exchanged between the group member node 102D and the tentative group member node 102E. The session key 220 contains data that is unique to the communications session between the group member node 102D and the tentative group member node 102E. This also occurs at operation 310 of the routine 300 and at operation 358 of the routine 350. As will be described in greater detail below, the session key 220 is utilized to transmit the password from the tentative group member node 102E to the group member node 102D in a more secure fashion.

From operation 358, the routine 350 continues to operation 360, where the tentative group member node 102E transmits its public certificate 214 to the group member node 102D through the encrypted communications channel. The group member node 102D receives the public certificate 214 at operation 312 of the routine 300. The public certificate 214 is a signed certificate that includes the public cryptography key of the tentative group member node 102E. As will be discussed in greater detail below, the public certificate 214 is utilized to create a credential for the tentative group member node 102E that can be utilized by the node 102E to prove that it is a member of the group 104.

From operation 312, the routine 300 continues to operation 314, where the member node 102D transmits its group membership certificate ("GMC") 218 to the tentative group member node 102E. The GMC 218 is an X.509 certificate that chains back to a self-signed certificate called the group root certificate ("GRC"). The GMC 218 proves that the group member node 102D is actually a member of the group 104. The tentative group member node 102E receives the GMC 218 of the group member node 102D at operation 362 of the routine 350.

At operation 362, the tentative group member node 102E also utilizes the GMC 218 to determine whether the group member node 102D is actually a member of the group 104. In order to accomplish this, the tentative group member node 102E verifies that the GMC 218 of the group member node 102D has a valid chain of certificates up to the GRC for the group 104. If, at operation 364 of the routine 350, the tentative group member node 102E determines that the group member node 102D is not a member of the group 104, then the routine 350 branches to operation 374, where the communications session with the group member node 102D is closed. No further attempt is made to join the group 104. However, if it is determined at operation 364 that the group member node 102D is a member of the group 104, then the routine 350 continues to operation 366.

At operation 366, the tentative group member node 102E generates a hash 212 of the password 202. In one implementation, the tentative group member node 102E may generate a hash 212 of the hash of the password and the session key 220. In order to generate the hash value 212, the tentative group member node 102E may utilize a password group join API 222. The password group join API 222 takes as input the invitation 210 and the password 202. From this information, the password group join API 222 generates the hash 212 and transmits the hash 212 to the group member node 102D. The hash 212 is transmitted to the group member node 102D at operation 367. The group member node 102D receives the hash value 212 at operation 316 of the routine 300.

From operation 316, the routine 300 continues to operation 318, where the group member node 102D generates its own hash. In particular, in one implementation, the group member node 102D generates a hash of the hash of the password 206 and the session key 220. The routine 300 then continues to operation 320, where the group member node 102D compares its hash value with the hash value 212 received from the tentative group member node 102E. If the values are not the same, the routine 300 branches from operation 322 to operation 330, where the communications session with the tentative group member node 102E is discontinued. If, however, the values are identical, then the tentative group member node 102E is authorized as a new member of the group 104. From this point in time, the tentative group member node 102E is considered a new member of the group.

In order to authorize the tentative group member node 102E as a new member of the group 104, the routine 300 continues from operation 322 to operation 324, where a GMC 216 is created for the tentative group member node 102E. The GMC 216 is created utilizing the public key of the tentative group member node 102E contained in the public certificate 214 that was previously transmitted to the group member node 102D. The GMC 216 is transmitted to the tentative group member node 102E at operation 326 and received at operation 368 of the routine 350.

According to one implementation, the group member node 102D encrypts the GMC 216 using the password hash 212 and sends the encrypted GMC to the tentative group member node 102D. When the tentative group member node 102E receives the encrypted GMC, the tentative group member node 102E will then decrypt and verify it. This assures the tentative group member node 102E that the group member node 102D actually knows the password. This is desirable because, in some cases, a group to join may be selected based only on its friendly name, from which the actual identity of the group cannot be verified. The friendly name is not secure, and can be spoofed. By verifying that the authenticating node knows the same password, the tentative group member node 102E can verify that it is connecting to the correct group.

From operation 326, the routine 300 continues to operation 328, where the group properties 204, including the hash of the group password 206, is transmitted to the tentative group member node 102D. The tentative group member node 102E receives the properties 204 at operation 370 and stores the properties. The routine 350 then continues from operation 370 to operation 372, where the new tentative group member node 102E may utilize its GMC 216 to communicate with other nodes 102A-102D of the group 104 and to authorize itself to perform group activities. From operations 328 and 372, the routine 300 and 350 continue to operations 330 and 374, respectively, where the communications session between the group member node 102D and the tentative group member node 102E is ended. The routines 300 and 350 then continue to operations 332 and 376, respectively, where they end.

Figure 4:
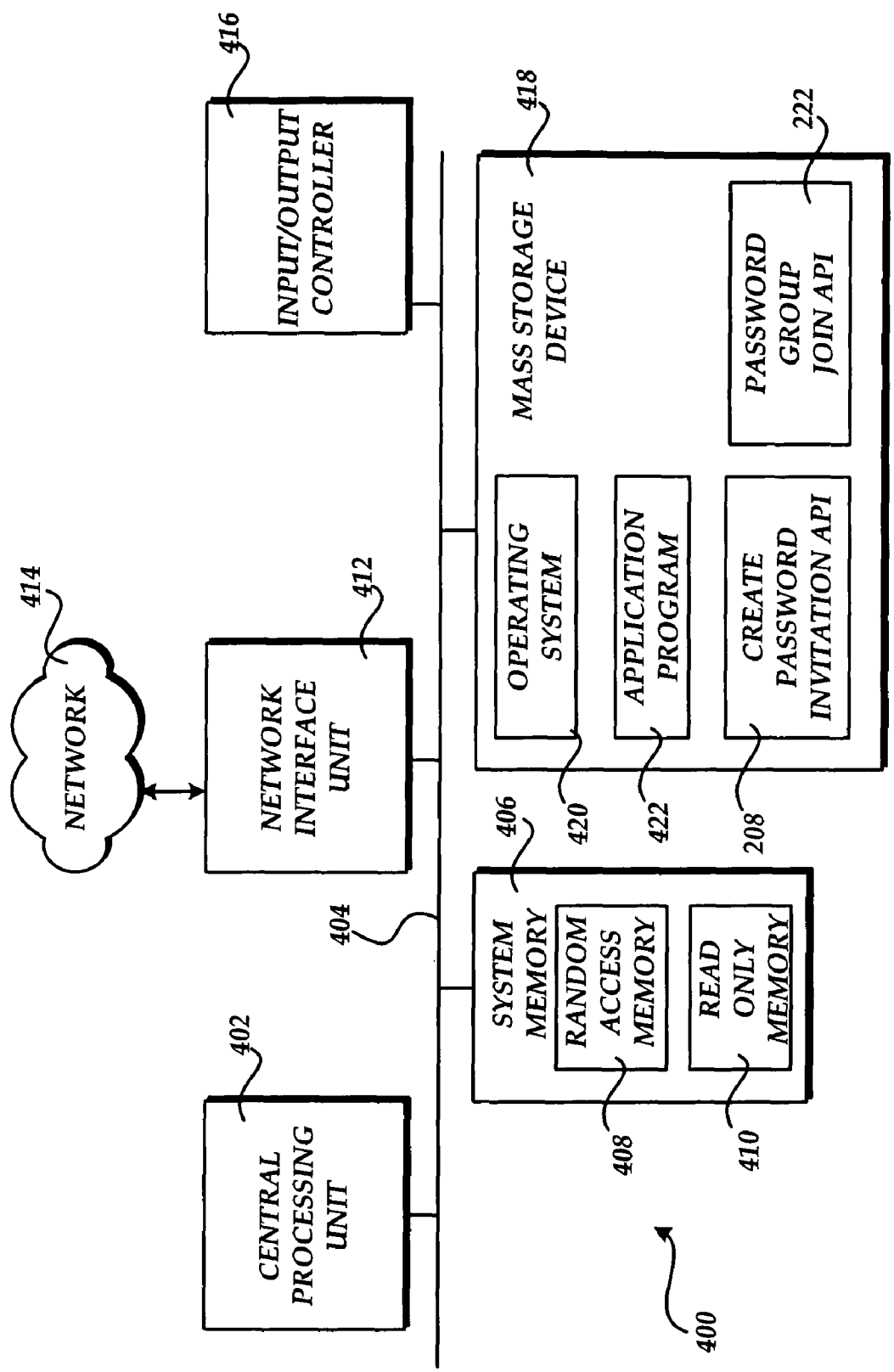
FIG. 4 is a computer architecture diagram showing a computer architecture suitable for implementing the various computer systems described herein.

Referring now to FIG. 4, an illustrative computer architecture for a computer 400 utilized in the various embodiments presented herein will be discussed. The computer architecture shown in FIG. 4 illustrates a conventional desktop, laptop computer, or server computer, and may be utilized to embody the nodes 102A-102E, described above. The computer architecture shown in FIG. 4 includes a central processing unit 402 ("CPU"), a system memory 406, including a random access memory 408 ("RAM") and a read-only memory ("ROM") 410, and a system bus 404 that couples the memory to the CPU 402. A basic input/output system containing the basic routines that help to transfer information between elements within the computer 400, such as during startup, is stored in the ROM 410. The computer 400 further includes a mass storage device 418 for storing an operating system 420, application programs, and other program modules, which will be described in greater detail below.

The mass storage device 418 is connected to the CPU 402 through a mass storage controller (not shown) connected to the bus 404. The mass storage device 418 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available media that can be accessed by the computer 400.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network 414, such as the Internet. The computer 400 may connect to the network 414 through a network interface unit 412 connected to the bus 404. It should be appreciated that the network interface unit 412 may also be utilized to connect to other types of networks and remote computer systems. The computer 400 may also include an input/output controller 416 for receiving and processing input from a number of other devices, including a keyboard, mouse, or electronic stylus (not shown in FIG. 4). Similarly, an input/output controller may provide output to a display screen, a printer, or other type of output device (also not shown in FIG. 4).

As mentioned briefly above, a number of program modules and data files may be stored in the mass storage device 418 and RAM 408 of the computer 400, including an operating system 420 suitable for controlling the operation of a networked computer, such as the WINDOWS XP operating system from MICROSOFT CORPORATION of Redmond, Wash. The mass storage device 418 and RAM 408 may also store one or more program modules. In particular, the mass storage device 418 and the RAM 408 may store the create password invitation API 208 and the password group join API 222. The functionality of these APIs is exposed to the operating system 420 and the application programs 422. The other software components illustrated in and described above with reference to FIG. 2 may also be stored on the mass storage device 418 and the RAM 408.

Based on the foregoing, it should be appreciated that systems, methods, and computer-readable media for utilizing a shared password to authenticate a node for membership in a group of nodes are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims. The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for authorizing the granting of authority to a computing node to participate in a group of computing nodes utilizing a shared group password, the method comprising:
   transmitting an invitation to join the group to a tentative group member node, the invitation comprising data that may be utilized by the tentative group member node to locate and establish a connection to a member node of the group who is authorized to grant group membership authority to others;
   transmitting a group password to the tentative group member node;
   establishing a connection with the tentative group member node;
   receiving a hash of the group password from the tentative group member node, the hash of the group password comprising a hash of a hash of the group password and session data unique to the connection with the tentative group member node;
   comparing the hash of the group password received from the tentative group member node to a previously stored hash of the group password; and
   in response to determining that the hash received from the tentative group member node matches the previously stored hash, granting authority to the tentative group member node to be a member of the group, wherein a group membership credential is utilized to validate the members of the group, and wherein granting group membership authority to the tentative group member node comprises
   receiving an identity certificate from the tentative group member node,
   utilizing the identity certificate to generate a group membership credential for the tentative group member node, and
   transmitting the group membership credential to the tentative group member node prior to receiving the hash of the group password from the tentative group member node, whereby the tentative group member node can utilize the group membership credential for the member node to confirm that the member node is a member of the group.

2. The method of claim 1, further comprising receiving one or more group properties from the member node, the group properties including the hash of the password.

3. The method of claim 1, wherein the group password and the invitation are transmitted to the tentative group member node out-of-band of the connection with the tentative group member node.

4. A method for authorizing the granting of authority to a computing node to participate in a group of computing nodes utilizing a shared group password, the method comprising:
   receiving an invitation to join the group, the invitation comprising data that may be utilized by a tentative group member node to locate and establish a connection to a member node of the group authorized to grant group membership authority;
   utilizing the data contained in the invitation to establish a connection with the member node;
   generating a hash of the group password;
   receiving a group membership credential and one or more group properties from the member node, the group properties including the hash of the password;
   determining based on the group membership credential whether the member node is a member of the group;
   in response to determining that the member node is a member of the group, transmitting the hash to the member node over the connection, whereby the member node can utilize the hash of the password to verify that the tentative group member node is authorized to become a new member of the group;
   transmitting an identity certificate to the member node for use in creating the group membership credential for the tentative group member node; and
   receiving authorization from the member node to become a new member in the group, wherein receiving authorization from the member node to become a new member of the group comprises receiving a group membership credential from the member node.

5. The method of claim 4, wherein the hash of the group password comprises a hash of a hash of the group password and session data unique to the connection with the member node.

6. The method of claim 4, wherein the group password and the invitation are received out-of-band of the connection with the member node.

7. A computer readable storage medium having computer-executable instructions stored thereon, wherein the medium is not a signal, which when the instructions are executed by a computer, will cause the computer to:
   receive an invitation to join a group, the invitation comprising data that may be utilized by a tentative group member node to locate and establish a connection to a member node of the group authorized to grant group membership authority;
   utilize the data contained in the invitation to establish a connection with the member node;
   generate a hash of the group password;
   receive a group membership credential and one or more group properties from the member node, the group properties including the hash of the password;
   determine based on the group membership credential whether the member node is a member of the group;

in response to determining that the member node is a member of the group, to transmit the hash to the member node over the connection, whereby the member node can utilize the hash of the password to verify that the tentative group member node is authorized to become a new member of the group;

transmit an identity certificate to the member node for use in creating the group membership credential for the tentative group member node; and to receive authorization from the member node to become a new member in the group, wherein receiving authorization from the member node to become a new member of the group comprises receiving a group membership credential from the member node.

8. The computer-readable storage medium of claim 7, wherein the instructions for the generating the hash of the group password further comprise instructions which, when executed by the computer, will cause the computer to generate a hash of a hash of the group password and session data unique to the connection with the member node.

9. The computer-readable storage medium of claim 7, wherein the instructions for receiving the group password and the invitation further comprise instructions which, when executed by the computer, will cause the computer to receive the group password and the invitation out-of-band of the connection with the member node.

* * * * *